US009926207B2

(12) United States Patent
Rodriguez (10) Patent No.: US 9,926,207 B2
(45) Date of Patent: Mar. 27, 2018

(54) SYSTEM AND METHOD FOR CONTROLLING THE CHEMICAL PROPERTIES OF A BODY OF LIQUID

(71) Applicant: Humberto Rodriguez, Lagro, IN (US)

(72) Inventor: Humberto Rodriguez, Lagro, IN (US)

(*) Notice: Subject to any disclaimer, the term of this patent is extended or adjusted under 35 U.S.C. 154(b) by 827 days.

(21) Appl. No.: 13/969,232

(22) Filed: Aug. 16, 2013

(65) Prior Publication Data

US 2015/0048032 A1  Feb. 19, 2015

(51) Int. Cl.
*B01J 49/00* (2017.01)
*C02F 1/00* (2006.01)
*C02F 1/68* (2006.01)
*C02F 103/42* (2006.01)

(52) U.S. Cl.
CPC ............ *C02F 1/008* (2013.01); *C02F 1/688* (2013.01); *C02F 2103/42* (2013.01); *C02F 2201/008* (2013.01); *C02F 2209/008* (2013.01); *C02F 2209/055* (2013.01); *C02F 2209/06* (2013.01); *C02F 2209/07* (2013.01); *C02F 2209/18* (2013.01); *C02F 2209/23* (2013.01); *C02F 2209/29* (2013.01)

(58) Field of Classification Search
None
See application file for complete search history.

(56) References Cited

U.S. PATENT DOCUMENTS

| 4,016,079 | A | * | 4/1977 | Severin | B01F 1/0027 137/93 |
| 4,033,871 | A | * | 7/1977 | Wall | G05D 21/02 137/5 |
| 4,402,850 | A | * | 9/1983 | Schorghuber | C02F 1/5236 210/702 |
| 4,525,253 | A | * | 6/1985 | Hayes | C02F 1/4606 204/229.2 |
| 7,424,399 | B2 | * | 9/2008 | Kahn | G01N 33/18 702/188 |

* cited by examiner

*Primary Examiner* — Richard C Gurtowski (57) ABSTRACT

An apparatus for controlling chemical properties of a body of water, the apparatus comprising: a housing, said housing comprising: a water sample collecting subassembly; chemical reagent dispensing subassembly; a water diagnostic subassembly; and a control module, said control module disposed on the housing, said control module comprising: a means for inputting desired functional parameters and water chemical properties into the apparatus; a means for measuring the actual physical conditions of the water; a means for comparing the actual physical conditions of the water to the desired physical conditions of the water; and a means for instructing the system to dispense chemical reagents to the water at a rate and dosage necessary to cause the water to generally achieve the desired physical conditions within a desired period of time and for a desired time period; and a means for displaying the apparatus parameters and water chemical properties in human readable form.

8 Claims, 7 Drawing Sheets

FIG. 1

SYSTEM AND METHOD FOR CONTROLLING THE CHEMICAL PROPERTIES OF A BODY OF LIQUID

REFERENCE TO RELATED APPLICATIONS

This application for letters patent claims priority from U.S. provisional patent application No. 61/683,718, entitled Pool Water Tester, having the same inventor as the present application, and hereby incorporated by reference into the present application for letters patent.

BACKGROUND

1. Field of the Art

The present invention relates generally to systems, devices, and methods for controlling the certain predetermined chemical properties of a body of water. More specifically, the present invention relates to portable, low cost, robust, systems, devices, and methods for controlling the chlorine content and pH level of a swimming pool.

2. Description of the Prior Art

Many systems have been designed for controlling the chemical balance of a swimming pool and the like. For the most part, simple, inexpensive systems performing this function automatically dispense pre-set amounts of chemicals into the pool at pre-set intervals. They do not sense or respond to the chemical condition of the pool, a condition which will vary dramatically with pool usage, weather, temperature, and other environmental factors. Thus, they easily can cause the chemical balance of the pool to depart considerably from the proper range. The more expensive, elaborate versions of such systems do sense the chemical balance of the pool, and dispense chemicals to maintain the balance of a pool with a given range. However, because of their elaborate nature such systems only are economical for large, heavily used pools.

A typical swimming pool recirculating system includes a pool, a skimmer 4 through which water passes to a pipe leading to a pump that forces this water the recirculating system. The system generally uses electrodes to measure the reduction-oxidation potential, and therefore the concentration of oxidizing agents such as chlorine, of the liquid flowing past it.

The signals from these electrodes are supplied to an electronic controller. The controller compares the outputs of the electrodes to standards indicative of the desired pH and oxidizing (chlorine) balance of the pool. When the balance sensed by either electrode departs from a given range, the controller energizes the appropriate solenoid valve to cause the appropriate chemical to be fed from a chemical supply bottle through a pilot tube. The water flowing through the intake line and past the pilot tubes produces sufficient negative pressure within the tubes to, when the associated solenoid valve is open, draw chemical from the chemical supply containers. Alternatively, instead of employing pilot tubes and solenoid valves, pumps may be used to positively force chemicals through the supply lines.

U.S. Pat. No. 4,224,154 discloses a system for controlling the chemical balance of a body of liquid, such as a swimming pool, compares the output of a chemical balance sensor immersed in the liquid with a standard indicative of the desired chemical balance, then dispenses a chemical into the pool to adjust its balance towards the desired balance. A timer limits the duty cycle of the dispenser to a relatively short dispensing interval followed by a longer non-dispensing interval permitting the dispensed chemical to disperse throughout the pool, the sensing and dispensing cycle then being repeated if appropriate. Preferably, there are a plurality of sensors, comparators and dispensers, each dispenser having a timer to limit its duty cycle. Also, preferably an over-range alarm is employed to alert an attendant when the chemical balance of the pool departs from a given range. Further, preferably the system is adjustable permitting both the desired balance level and the water limits defining the given range to be simultaneously adjusted. The system may be employed with either a dry or liquid chemical dispenser.

U.S. Pat. No. 5,772,872 discloses a portable water treatment system for bulk filling of a swimming pool with treated water. The system discloses a pH conditioning tank and a water conditioning tank allowing for the filling of a pool, without the need for pumps, electricity, or controls on the incoming water source. The system includes the use of soaker devices that allow treatment of the water through the addition of a predetermined amount of chemical as it is exposed to the incoming water. The system allows for treated water to be placed into the pool so as to prohibit early degradation of the walls or materials of the swimming pool surfaces.

U.S. Pat. No. 6,022,481 discloses a swimming pool cleaning system includes a pump, a first tube coupling a suction port of the pump in fluid communication with a main drain or mobile cleaning device which draws water and settled debris from the bottom of the pool, and a skimming device including an entrainment nozzle. The entrainment nozzle is coupled by a second tube to a coupling device which diverts a small portion of pool return water pumped from an outlet port of the pump. Most of the pool return water is pumped into a rotary distribution valve, various outlets of which are connected to various pool cleaning heads embedded in an inner surface of the pool. A vacuum canister having a removable cover to allow access to a removable debris trap disposed in the vacuum canister between an inlet and an outlet thereof is coupled between a suction inlet of the pump and the main drain or mobile cleaning device. A single low-horsepower pump produces simultaneous effective skimming, operation of embedded cleaning heads, and trapping of debris in a trap in a vacuum canister.

U.S. Pat. No. 6,180,412 discloses an improved test is described for chlorine in pool and spa water where potassium monopersulfate is used as an oxidizing agent and DPD is used as an indicator. N,N-bis(hydroxyethyl)-2-aminoethane sulfonic acid or bicine is used to mask or eliminate the potassium monopersulfate so that it does not interfere with the DPD indicator. The test is very reliable and accurate.

U.S. Pat. No. 6,419,840 discloses a cleaning system for a swimming pool having plural active drains deployed about the bottom wall of a swimming pool and that cooperate with plural stationary nozzles mounted in the side walls that direct a flow of water down the side wall of the swimming pool. The directional nozzles dislodge debris from the side and bottom walls which is swept toward and received by the plural active floor drains, thus cleaning the pool. Additionally, the active floor drains have a grid cover that admits larger debris and does not prohibit the use of mobile pool cleaners. The active floor drains are connected to in-deck, fine mesh canister filters to remove medium and large size debris before it reaches the water pump and balance of the pool filtration system.

U.S. Pat. No. 6,749,091 discloses a single dosage dispenser for delivering chemical reagent to a test sample includes a body having an inlet and opposing outlet. The inlet is threadably and communicably engaged with a container holding a chemical reagent. The outlet includes a plurality of stepped receptacles for communicably receiving respective sizes of test sample holders. A spring actuated plunger is slidably mounted within the dispenser body between the inlet and the outlet. The plunger includes a reagent accommodating compartment. The spring urges the plunger into a first state wherein the plunger is communicably connected to the inlet for receiving a single dosage of reagent from the container. The user presses the plunger to drive the plunger within the dispenser body so that the compartment is communicably connected to the outlet. As a result, the reagent in the compartment is dispensed through the outlet into the test sample holder.

U.S. Pat. No. 6,866,774 discloses a portable pool cleaning system for the remote cleaning of a swimming pool including a housing and a base. A motor is connected to the housing and is attached to a high pressure pump wherein the pump includes both intake and ports. The first tubing is connected to the intake port and the opposite end is inserted into the swimming pool for the transportation of water from the swimming pool to the pump. A second tubing is connected to an output port of the high pressure pump with the opposite end of the second tubing placed into the swimming pool and attached to a self-propelled cleaning device. The self-propelled cleaning device uses a high pressure water stream as a scrubbing function. The motor is connected to a timer which is connected to a power source. The timer initiates the activation and deactivation of the motor and the self-propelled cleaning device. A means for attaching the base and portable pool cleaning system to the periphery of the swimming pool is also included.

U.S. Pat. No. 6,979,400 discloses a mobile apparatus, typically in the form of automatic swimming pool cleaners, capable of indicating temperatures (or pressures) of the pool water in which they are deployed are discussed. The indication may, but need not necessarily, occur through change in color of one of more components of the cleaners. Some versions may have floats adapted to provide this color change. These or other versions may include floats that are not spherical in shape as well. Alternatively, temperature (or pressure) indication may be provided by other aspects of a water-circulation system.

U.S. Pat. No. 7,214,310 discloses a portable pool cleaning system for the remote cleaning of a swimming pool including a housing and a base. A motor is connected to the housing and is attached to a high pressure pump wherein the pump includes both intake and ports. The first tubing is connected to the intake port and the opposite end is inserted into the swimming pool for the transportation of water from the swimming pool to the pump. A second tubing is connected to an output port of the high pressure pump with the opposite end of the second tubing placed into the swimming pool and attached to a self-propelled cleaning device. The self-propelled cleaning device uses a high pressure water stream as a scrubbing function. The motor is connected to a timer which is connected to a power source. The timer initiates the activation and deactivation of the motor and the self-propelled cleaning device. A means for attaching the base and portable pool cleaning system to the periphery of the swimming pool is also included.

U.S. Pat. No. 7,300,576 discloses a swimming pool cleaning system includes a pump, a first tube coupling a suction port of the pump in fluid communication with a main drain or mobile cleaning device which draws water and settled debris from the bottom of the pool, and a skimming device including an entrainment nozzle and a safety tube. The entrainment nozzle is coupled by a second tube to a coupling device which diverts a small portion of pool return water pumped from an outlet port of the pump. The safety tube extends from above the water line and above the debris trap in the skimmer to the body of the skimmer below the debris trap. Most of the pool return water is pumped into a rotary distribution valve, various outlets of which are connected to various pool cleaning heads embedded in an inner surface of the pool. A single low-horsepower pump produces simultaneous effective skimming and operation of embedded cleaning heads.

U.S. Pat. No. 7,594,997 discloses a portable skimmer, motor and pump protector for a swimming pool or a hot tub having a sidewall, an adjoining top deck, a skimmer in the sidewall, in fluid communication with the pool pump and motor. The protector includes a frame having a top portion resting against the top deck, an upright portion resting against the sidewall, wherein the frame surrounds the skimmer. A handle extends from the top frame portion. Removable netting surrounds the frame to permit passage of water but prevent passage of leaves and other debris into the skimmer.

U.S. Pat. No. 7,794,660 discloses a fluid content monitor including a cuvette, a calorimeter adapted to generate a signal indicative of contents of a fluid sample contained in the cuvette, a container for holding a reagent, and a pump assembly for delivering reagent from the container to the cuvette. The pump assembly includes a tube extending from the container to the cuvette, check valves preventing reverse flow in the tube, and a hammer driven by a solenoid for repetitively compressing the tube to pump reagent to the cuvette. The cuvette can be removed for cleaning and replacement.

U.S. Pat. No. 8,128,815 discloses a portable self-contained, battery operated vacuum unit which is attachable by a hose to an underwater vacuum head for cleaning the floor of a swimming pool, a pond, a fish tank, or the like includes a rotomolded body having lower wheels and an upper handle so that it can easily be wheeled to a desired location. The handle is formed as an overhang with lower bumpers so that the unit can be partially submersed in a pool hanging on the edge of the pool. The body contains a battery operated pump, a rechargeable battery selectively coupled to the pump by a switch, a filter and a basket. A hose coupling is arranged above the basket and the inlet of the pump is arrange below the filter which is located below the basket. The outlet of the pump is arranged at the bottom front of the unit. The unit may also be used as a filter for any liquid.

U.S. Pat. No. 8,402,586 discloses a motorized robot for cleaning swimming pools, including: means (2) for moving the robot, having a surface (3) for making contact with a movement surface submerged in the swimming pool; means (4) for generating a circulation of fluid in the robot, including an opening for the suction (5) of said fluid, and an opening for the backflow (6) of the aspirated fluid; a conduit (7) of fluid connecting the suction and backflow openings; means for generating (8) a flow of said fluid in the conduit; a strut for lifting at least part of the contact surface (3) from the movement surface, said strut being mobile between a first inactive position in which the strut is retracted inside the robot and a second active position in which the strut projects past the contact surface of the movement means in such a way that part of said contact surface can no longer be in contact with the movement surface; and means for controlling (10) the movement of the strut between its active and inactive positions, said means being activated by a movement of the fluid in the fluid conduit, and including means (11) for opposing the movement of the fluid in the fluid conduit (7), which are mobile in said conduit in such a way as to at least partially block the conduit or release it, and connected to the strut in such a way that the strut takes on its active or inactive position according to the position adopted in the fluid conduit by the opposition means.

U.S. Pat. No. 8,465,651 discloses a sustainable method and system for treating and maintaining bodies of water at low cost for low density recreational use is disclosed. A system of the invention generally includes at least one containing means, at least one coordination means, at least one chemical application means, at least one non-intrusive mobile suction means, and at least one filtration means. The coordinating means can receive information regarding water quality parameters that are controlled, and can timely activate the processes necessary to adjust the water quality parameters within their respective limits. The disclosed methods and system filter only a small fraction of the total water volume, up to 200 times less per day than the flow filtered by conventional swimming pool filtration systems. The disclosed methods and system also use less chemicals, up to 100 times less than conventional swimming pool water treatment systems. The methods and system of the present invention can be used to treat recreational water bodies affected by bacteria and microalgae and provide sustainable methods for producing water that complies with bacteriological and physicochemical requirements for recreational water, as set forth by governmental regulatory agencies such as the Environmental Protection Agency (EPA), for bathing with full body contact.

Maintaining the chemical balance of a swimming pool is quite important. If the chemical balance departs from (drops below) a given range, unsanitary conditions will develop permitting algae and bacteria to grow and contaminate the pool. If such conditions exist for long, they may require the pool to be drained and acid washed. Improperly high chlorine and pH levels can cause eye and skin irritations to swimmers, as well as pipe corrosion or scaling to the recirculating system, giving rise to increased heating costs due largely to the resultant inefficiencies. Improper chemical balance also may waste costly chemicals.

The known prior art does not disclose a portable, robust, low cost, programmable, wirelessly controllable, highly accurate, non electrode based water treatment system or method. Thus, there is a real need for an automatic chemical control system for a swimming pool, one which is relatively simple in construction yet sensitive and durable in operation. Such a system would provide significant safety and a real convenience to the pool owner, reducing his usage of pool chemicals and permitting him to leave the pool unattended for extended periods of time and have the pool available for use at any time.

SUMMARY

The system described herein meets these objectives, as well as other objectives which will be apparent to those skilled in the art upon reading the following detailed description.

The disclosed system for controlling the chemical balance of a pool of liquid within a given range includes at least one sensor for continuously detecting the chemical balance of the liquid and producing an output indicative of that chemical balance. Means are connected to the output of the sensor to compare it to a standard indicative of the desired chemical balance in the pool, and to actuate dispensing means when the actual chemical balance departs substantially from the desired chemical balance, the dispensed chemicals adjusting the chemical balance of the pool towards the desired level. Timing means are provided to limit the duty cycle of the dispensing means to a relatively short dispensing interval, followed by a longer non-dispensing interval permitting the dispensed chemical to disperse throughout the pool, this delay ensuring that an excessive amount of chemical will not be dispensed into the pool, once the dispensing cycle begins, while the dispensed chemical is dispersing sufficiently to be sensed by the sensor.

The system is employed to control the chlorine and pH balance of a swimming pool. Two sensors are used, one to detect the chlorine balance, the other to detect the pH balance. Comparator, dispenser and timer means are connected to each sensor to control the dispensing of the chemical intended to adjust the condition sensed by the associated sensor. Preferably, the system also includes means to detect an out-of-range condition and to actuate an out-of-range alarm upon occurrence of that condition to alert the pool attendant. Also, preferably manual means are provided for selectively overriding the control system and causing the actuating means to dispense a chemical. Further, preferably the system is adjustable, permitting both the desired balance level and the water limits defining the given range to be simultaneously adjusted. The system may be employed with either a dry or liquid chemical dispenser.

In one exemplary embodiment, an apparatus for controlling chemical properties of a body of water, the apparatus comprising: a housing, said housing comprising: a water diagnostic subassembly; at least one chemical reagent dispensing subassembly; and a water dispensing subassembly; a control module, said control module disposed on the housing, said control module comprising: a means for inputting desired functional parameters and water chemical properties into the apparatus; a means for measuring the actual physical conditions of the water; a means for comparing the actual physical conditions of the water to the desired physical conditions of the water; and a means for instructing the system to dispense chemical reagents to the water at a rate and dosage necessary to cause the water to generally achieve the desired physical conditions within a desired period of time and for a desired time period; and a means for displaying the apparatus parameters and water chemical properties in human readable form.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

In the drawings:

FIG. 4A shows a perspective view of a reagent dispensing subassembly of a portable pool treatment device according to the present invention.

DETAILED DESCRIPTION OF THE EMBODIMENTS

The present invention will be discussed hereinafter in detail in terms of the preferred embodiment according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscuring of the present invention.

Figure 1:
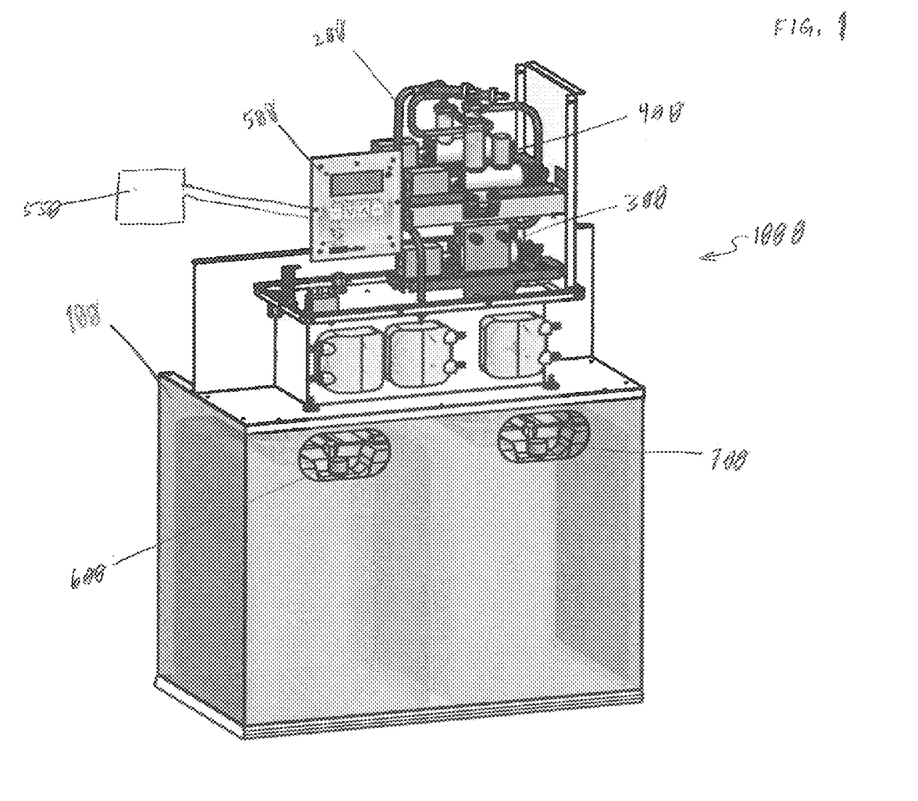
FIG. 1 shows a perspective assembly view of a portable pool treatment device according to the present invention.

Referring first to FIG. 1, there is shown a portable pool treatment device according to the present invention. Pool treatment device 1000 generally comprises a housing 100. Housing 100 is preferably movable. In an exemplary embodiment, housing 100 of pool treatment device 1000 comprises a plurality of casters (not shown) to allow for easy rolling translation of pool treatment device 1000.

Pool treatment device 1000 is fluidically connected to a swimming pool (not shown). However, those of skill in the art will appreciate that pools treatment device 1000 may be used with any body of water having a generally known or estimated volume.

Referring again to FIG. 1, where there is shown an assembly view of portable pool water treatment device 1000 according to the present invention, pool treatment device 1000 comprises a modular design wherein the various components interior to housing 100 can be easily rearranged, included, or removed based on the needs of an end user.

As further illustrated in FIG. 1, pool treatment device 1000 generally comprises housing 100 containing water sampling subassembly 200, diagnostic subassembly 300, reagent dispensing subassembly 400, electronic control module 500, chlorine dispensing system 600, and acid dispensing system 700.

Figure 2A:
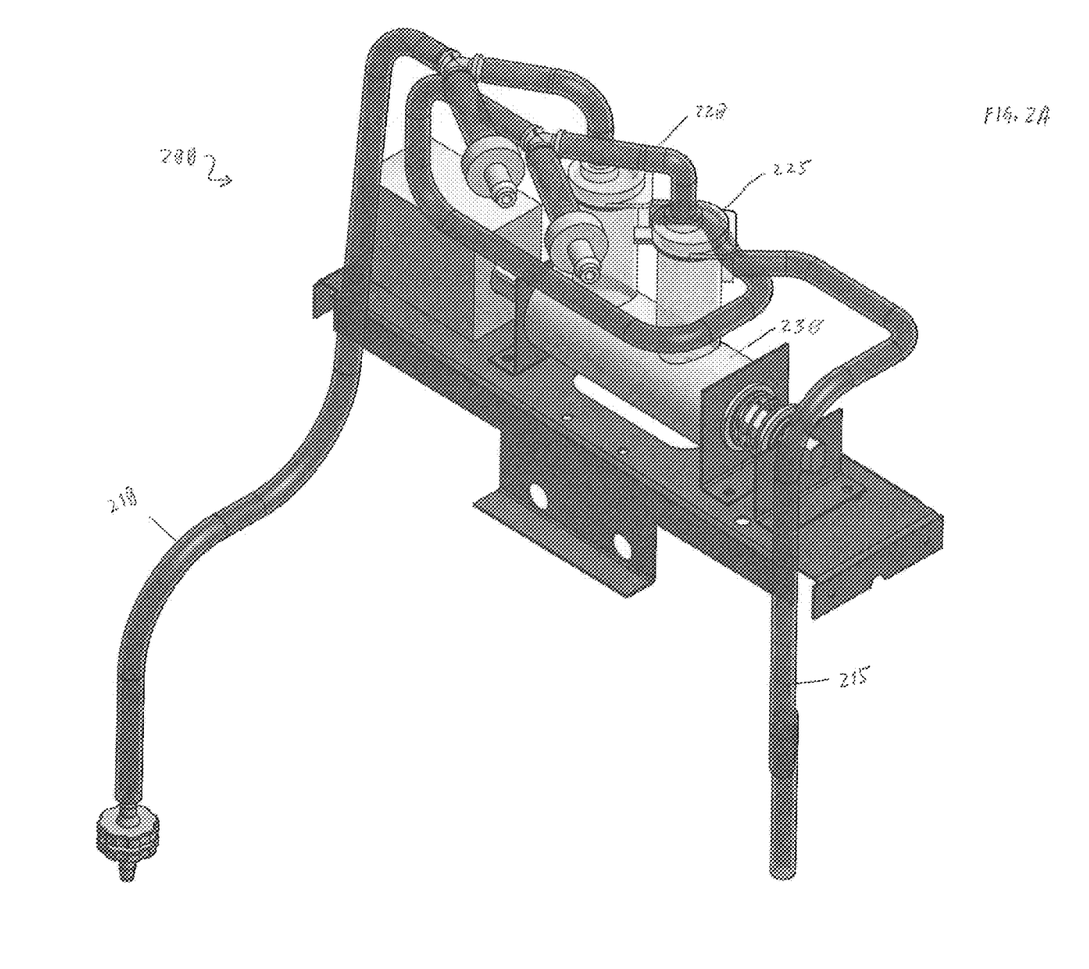
FIG. 2A shows a perspective view of a water sampling subassembly of a portable pool treatment device according to the present invention.
Figure 2B:
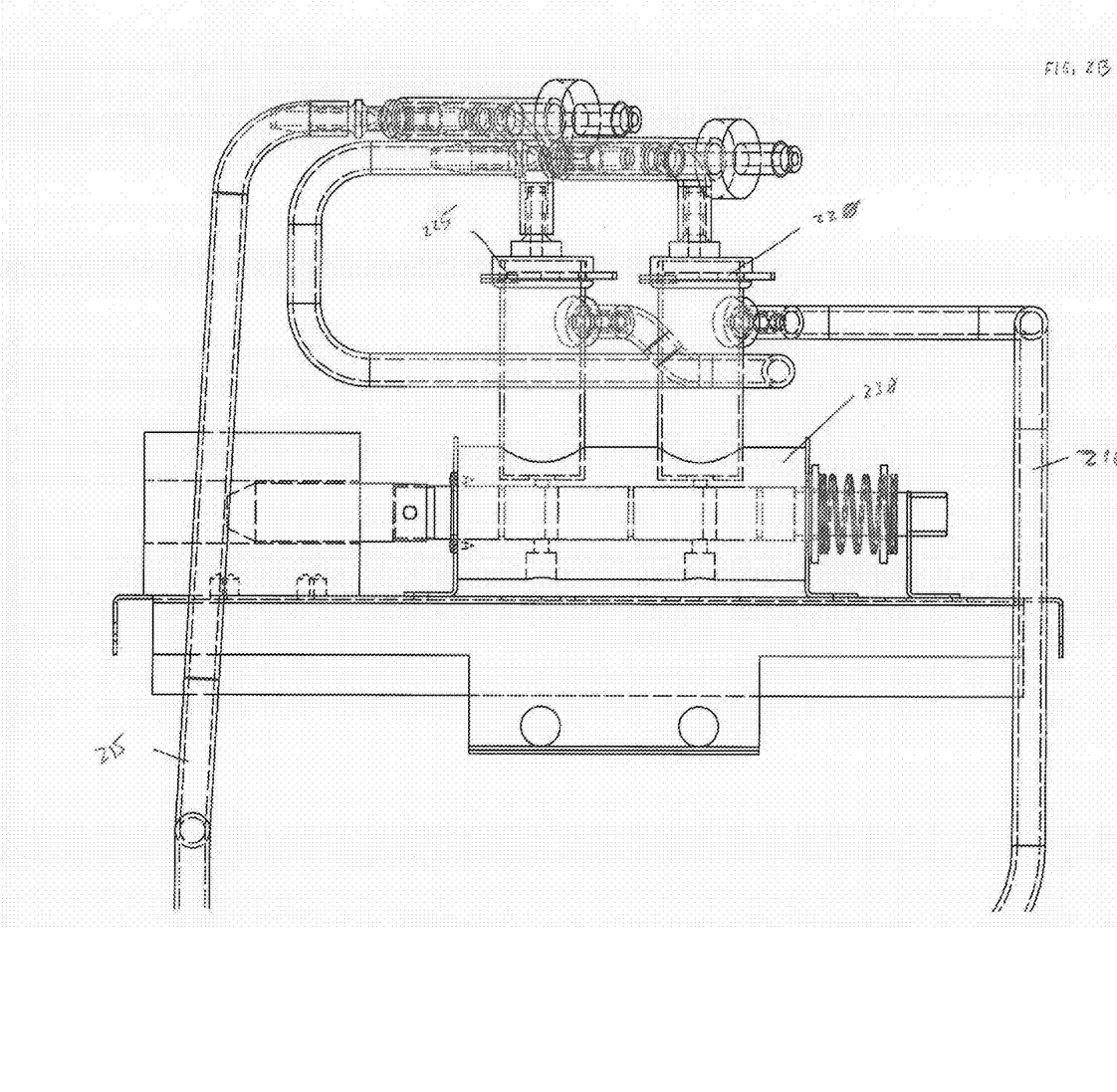
FIG. 2B shows a side cross-sectional view of a water sampling subassembly of a portable pool treatment device according to the present invention.

Referring now to FIGS. 2A and 2B, there is shown water sampling subassembly 200 of portable pool treatment device 1000 according to the present invention. Water sampling subassembly 200 functions to collect a predetermined amount of water for distribution to a diagnostic device to testing the chemical properties of the water sample and by extension the body of water from which said water sample was taken. Water sampling subassembly 200 generally comprises water inlet tube 210. Water inlet tube 210 is fluidically connected to a swimming pool or other body of water (not shown). Additionally, a pump (not shown) of common design is operably connected to water inlet tube 210 to force a desired amount of water from the swimming pool through water inlet tube 210.

Referring again to FIGS. 2A and 2B, water sampling subassembly 200 of water treatment device 1000 further comprises a pair of sample collection chambers 220 and 225 which chambers are fluidically connected at one end to water inlet tube 210 and further connected to drainage tube 215. Drainage tube 215 of water sampling subassembly 200 is fluidically connected to a physical drain or other suitable waste or excess water location. Water sampling subassembly 200 further comprises solenoid valve 230 which is operably connected to water sample collection chambers 220 and 225 at ends opposite to the connections to inlet tube 210.

As the terms are used herein, a solenoid is a transducer that converts energy into linear motion. A solenoid valve is an integrated device containing an electromechanical solenoid which actuates either a pneumatic or, as here, hydraulic valve. A solenoid valve comprises a solenoid and the valve. The solenoid converts electrical energy into mechanical energy which, in turn, opens or closes the valve mechanically. Thus, the valve is controlled by an electric current through the solenoid; in the case of a two-port valve, as here, the flow is switched on or off. For the purposes of the present writing, an "energized" solenoid opens the solenoid valve. Additionally, in the exemplary embodiments of the present invention, a bias spring is disposed within the solenoid valve to push the solenoid of the solenoid valve back into a position such that the solenoid valve is closed when the solenoid is not energized. However, those of skill in the art will appreciate that any two way solenoid valve can be used effectively within the scope of the present invention.

Referring again to FIGS. 2A and 2B, upon being energized, solenoid valve 230 allows water to flow from fluid chambers 220 and 225. Those of skill in the art will appreciate that alternative embodiments of the current invention can comprise one or a plurality of water sample collection chambers.

Referring generally to FIG. 2A and more specifically to FIG. 2B, water collection chambers 220 and 225 are generally closed, but they open upon energizing the solenoid of solenoid valve 230. Chambers 220 and 225 respectively are disposed such that when opened by solenoid valve 230, each chamber 220 and 225 is fluidically connected (as shown in FIG. 1) to test chambers 320 and 325 of water diagnostic subassembly 300 (FIGS. 3A and 3B) such that water collection chamber 220 empties into test chamber 320, and water collection chamber 225 empties into test chamber 325.

Figure 3A:
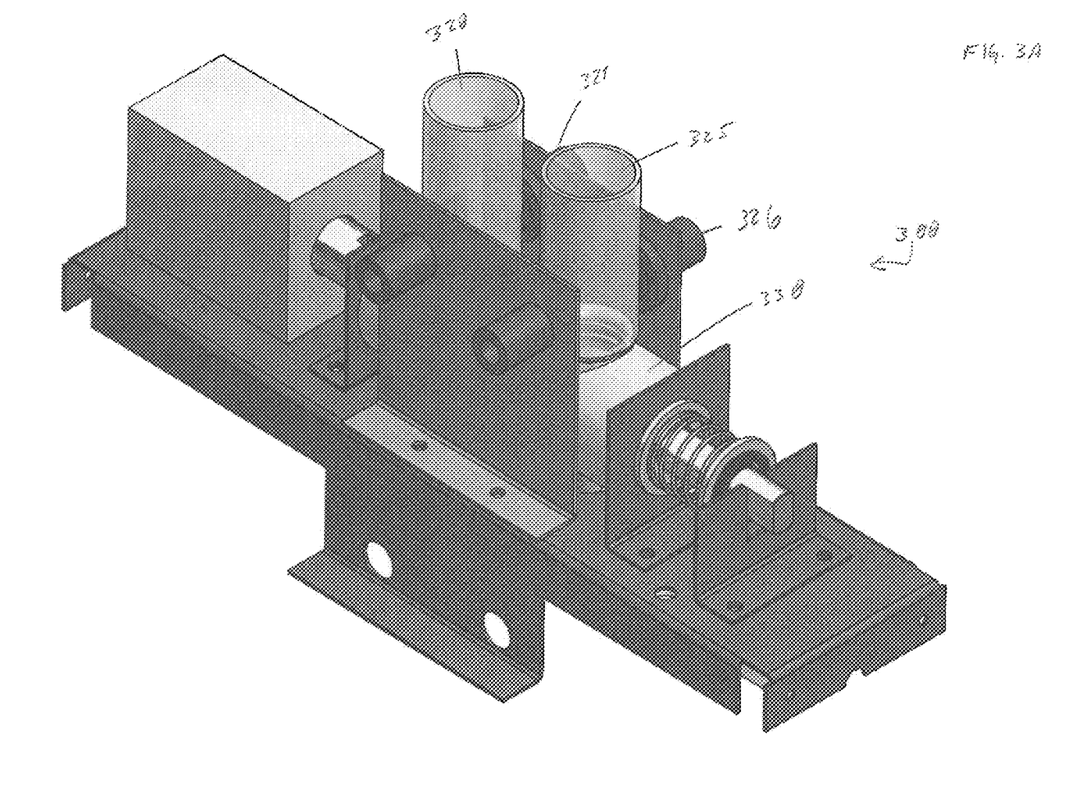
FIG. 3A shows a perspective view of a water diagnostic subassembly of a portable pool treatment device according to the present invention.
Figure 3B:
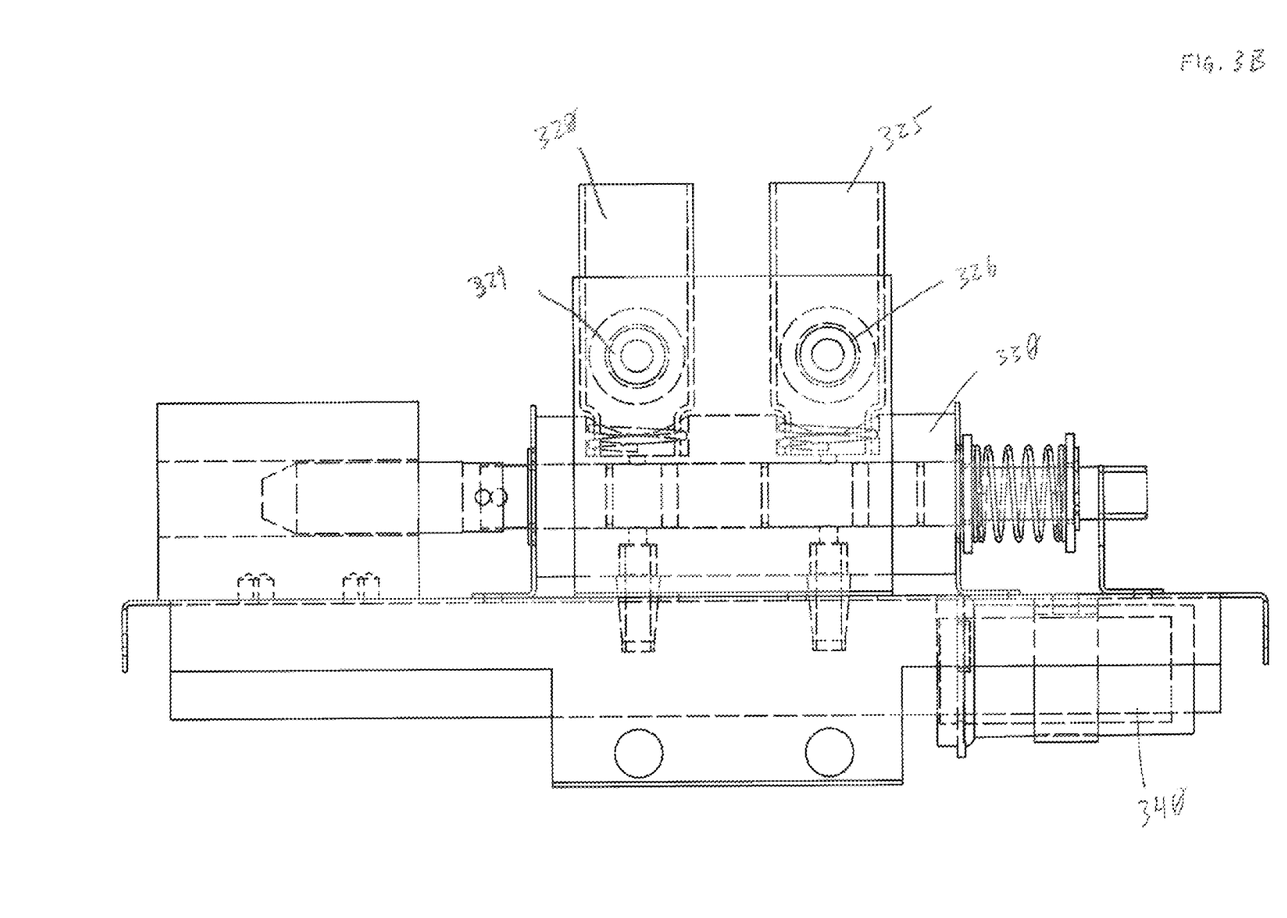
FIG. 3B shows a side cross-sectional view of a water diagnostic subassembly of a portable pool treatment device according to the present invention.

Referring now to FIGS. 3A and 3B, there is shown a water diagnostic subassembly 300 of portable pool treatment device 1000 according to the present invention. Water diagnostic subassembly 300 measures the acidity and the chemical content of the respective water samples. In an exemplary embodiment of the present invention, water diagnostic subassembly 200 tests for pH of the sample and for selected chemical concentrations within the water, such as the concentration of combined chlorine, free chlorine, total chlorine, cyanuric acid, copper, bromine, alkalinity, ozone, calcium hardness, phosphate, and chloride salt.

As previously mentioned, and referring again to FIGS. 3A and 3B, water diagnostic subassembly 300 comprises a pair of generally side by side, vertically disposed test chambers 320 and 325. Chambers 320 and 325 are disposed atop electronic solenoid valve 330 such that test chambers 320 and 325 are open at one end upon the solenoid of solenoid valve 330 being energized.

As further illustrated in FIG. 3B, water diagnostic subassembly 300 further comprises a pair of photometers 321 and 326 operably attached to test chambers 320 and 325, respectively. For the purposes of the present application, photometers 321 and 326 comprise a basic known design for electronic photometers wherein monochromatic light is allowed to pass to a light detector through an optically flat container containing a solution with a colored substance ("reagent"), preferably N, N-diethyl-p-phenylenediamine ("DPD") having wavelengths ranging from 490 to 555 nanometers. The light detector measures the intensity of the light compared to the intensity after passing through an identical cell with the same solvent but without the colored substance. From the ratio between the light intensities, knowing the capacity of the chosen reagent to absorb light (the absorbancy of the reagent, or the photon cross section area of the molecules of the reagent at a given wavelength), the concentration of the substance is calculated using Beer's law. Photoelectric photometers contain light-sensitive devices that convert light into electricity or undergo changes in electrical resistance when exposed to light. Two types of photoelectric cells are photovoltaic cells and photoconductive, or photoresistor, cells. The photovoltaic cell generates an electric current when light falls on it. The photoconductive cell undergoes changes in electrical resistance when exposed to light and regulates the flow of current that is supplied by a battery or other electric power source. In both types of cells the strength of the current varies with the amount of illumination. Intensity of light is determined by measuring the current with a galvanometer, microammeter, or other electric meter.

Figure 4B:
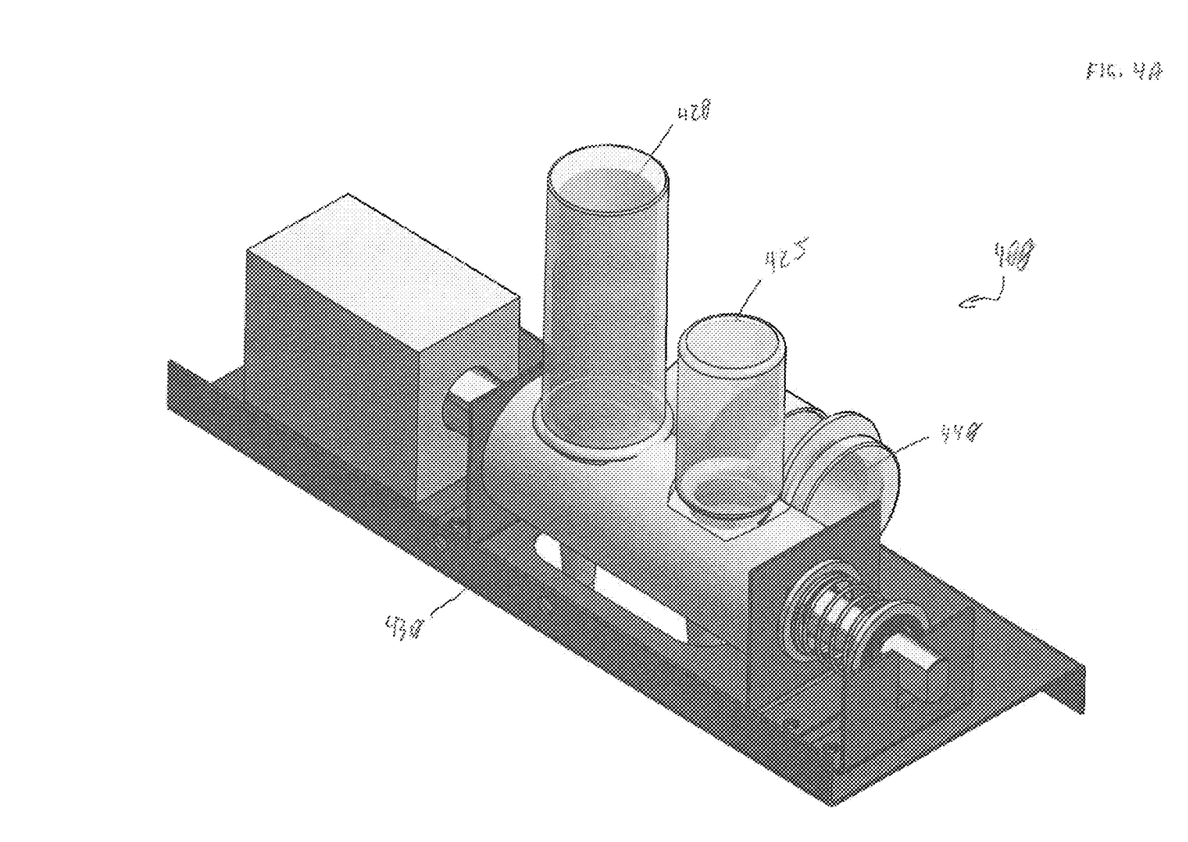
FIG. 4B shows a side cross-sectional view of a reagent dispensing subassembly of a portable pool treatment device according to the present invention.

Photometers 321 and 326 of water diagnostic subassembly 300 are further electronically connected to control module 500. Photometers 321 and 326 function to measure the pH level and chlorine content, respectively, of the water sample distributed from water sample chambers 220 and 225 of water sample subassembly 200 to test chambers 320 and 325 of water diagnostic subassembly 300. Test chambers 320 and 325 are further arranged and disposed to receive reagents from reagent dispensing subassembly 400 (FIGS. 4A and 4B). Those of skill in the art will appreciate that reagents in powder, liquid, tablet, or test strip form might be added manually or via alternative means to water diagnostic subassembly 400.

As illustrated in FIG. 3B, water diagnostic subassembly 300 further comprises electric vibrational motor 340. Vibrating motor 340 is operably connected to control module 500. Vibrating motor 340 oscillates subassembly 300 to ensure proper mixing of the water and reagent in test chambers 320 and 325 to facilitate the photometric analysis of the pH level an chlorine content of the water samples in the manner described herein above.

Referring now to FIGS. 4A and 4B, there is shown chemical reagent dispensing subassembly 400 within housing 100 of portable pool treatment device 1000 according to the present invention. Chemical reagent dispensing subassembly 400 may comprise vibrating motor 440. Chemical reagent dispensing subassembly 400 further comprises a pair of dispensing reagent tubes 420 and 425. Reagent tubes 420 and 425 are adapted to receive common commercially available reagent containers. However, preferably chemical reagent dispensing subassembly 400 is adapted to receive 10 mL containers of DPD. The reagent is preferably in powder form, but it may be in liquid form.

As further illustrated in FIGS. 4A and 4B, reagent tubes 420 and 425 are disposed atop and fluidically connected to solenoid valve 430. Solenoid valve 430 is adapted to deliver discrete predetermined reagent doses of to water sample chambers 320 and 325 of water diagnostic sub assembly 300 as is generally illustrated in FIG. 1. In an alternative embodiment of the present invention, not shown, non liquid reagents, such as tablets, might be used.

Returning now to FIG. 1, there is shown control module 500. Control module is operably connected to a power source 550 by known means, preferably a 12 volt dc (100-120 watts) or transformer attached to a standard home power source. However, the present invention may be adapted to work with any type of electrical power supply. Control module 500 is further electronically connected to water sample subassembly 200, water diagnostic subassembly 300, reagent dispensing subassembly 400, chlorine dispensing pump 600, and acid dispensing pump 700.

Referring again to FIG. 1, power source 550 is also operably attached via known means such as electronic wiring to water sample subassembly 200, water diagnostic subassembly 300, reagent dispensing subassembly 400, chlorine dispensing pump 600, and acid dispensing pump 700 by commonly understood wired electronic connections such that power is transferred to each powered component of each subassembly. Power source 550 is further electronically connected to each component In general, the above described pool treatment device 1000 operates by the following method: A user inputs certain information into control module 500. Such information may include desired time and date to use the pool, desired chlorine content, or a desired pH level. In the preferred embodiment, the control module will be pre-programmed with the optimal chlorine content and pH level for the swimming pool based on the known ambient conditions.

Control module 500 of pool treatment device 1000 will initiate the following steps. Water sample subassembly 200 will be instructed to collect a water sample and distribute the same to water diagnostic subassembly 300 as described above. Thereafter, reagent dispensing subassembly 400 will provide an appropriate (preprogrammed) dose of reagent to water diagnostic subassembly 300 such that subassembly can report the pH level and chlorine content of the sample and by extension, the swimming pool water, to the control module. The level may also be displayed in human readable form.

Based on the reported chlorine content, the control module may instruct the chlorine pump to add chlorine at a predetermined rate to reach an appropriate chlorine content to the swimming pool water to reach a desired safe level of chlorine within a particular time. Alternatively, the system my add chlorine at a predetermined rate and simply report that the pool will be suitable for use at a calculated time.

Based on the reported pH level, the control module may instruct the acid pump to add acid at a predetermined rate to reach an appropriate pH level to the swimming pool water to reach a desired safe pH level within a particular time. Alternatively, the system my add acid at a predetermined rate and simply report that the pool will be suitable for use at a calculated time.

In the preferred embodiment, the system runs a flush cycle of water without reagent after each test cycle and before collecting a water sample. Those of skill in the art will appreciate that the present invention may be combined with electrode based systems and methods for measuring or controlling the chemical properties of a body of water.

In the preferred embodiment, control module 500 is adapted to communicate via WiFi, internet, USB cable, satellite, or other means to devices such as smart phones, lap top computers, desk top computers, notebook computers, or tablet computers.

It should be understood that the above description is of an exemplary embodiment of the invention and included for illustrative purposes only. The description of the exemplary embodiment is not meant to be limiting of the invention. For example, the various subassemblies described herein, might be combined such that the water sampling and water diagnostic subassemblies are a single unit. A person of ordinary skill in the field of the invention or the relevant technical art will understand that variations of the invention are included within the scope of the claims.

The invention claimed is:

1. An apparatus for controlling chemical properties of a body of water, the apparatus comprising:
   a control module;
   a housing;
   a water sampling subassembly, said water sampling subassembly operably connected to a power source, to said control module, and to a water diagnostic subassembly;
   said water diagnostic subassembly operably connected to said power source, to said control module, to said water sampling subassembly, and to a reagent dispensing subassembly, said water diagnostic subassembly comprising means to determine at least one chemical property of a sample of water;
   said reagent dispensing subassembly operably connected to said power source, to said control module, and to said water sampling subassembly;
   a pumping mechanism, said pumping mechanism operably connected said control module and to said power source, and fluidically connected to said water sampling subassembly;
   an acid dispensing system, said acid dispensing system operably connected to said control module and to said power source, and fluidically connected to said body of water;
   a chlorine dispensing system, said chlorine system operably connected to said control module and to said power source, and fluidically connected to said body of water;
   wherein the pumping mechanism collects a water sample, the reagent dispensing subassembly dispenses a reagent, and the water sampling subassembly dispenses the water sample to the water diagnostic subassembly to determine the body of water chemical properties;
   wherein the control module, the water sampling subassembly, the power source, the water diagnostic subassembly, the reagent dispensing subassembly, the pumping mechanism, the acid dispensing system, and the chlorine dispensing system are all arranged within the housing as rearrangeable and removable modular components.

2. The apparatus of claim 1, wherein the body of water is contained within a structure selected from the group consisting of a pool, a spa, a pond, a lake, or a tub.

3. The apparatus of claim 1, wherein the apparatus is portable.

4. The apparatus of claim 1, wherein the apparatus further comprises an electrode based water diagnostic system.

5. The apparatus of claim 1, wherein the subassemblies are selectively removable from said housing.

6. The apparatus of claim 1, further comprising the apparatus being configured for wireless communication with a device selected from the group consisting of: a smart device, a desk top computer, the Internet, an intranet, a tablet computer, a smart phone, and a laptop computer.

7. The apparatus of claim 1, wherein the chemical properties are selected from the group consisting of pH level, combined chlorine, free chlorine, total chlorine, cyanuric acid, copper, bromine, alkalinity, ozone, calcium hardness, phosphate, and chloride salt.

8. The apparatus of claim 1, wherein the reagent is DPD.

* * * * *